United States Patent [19]

Takayasu

[11] 4,393,122
[45] Jul. 12, 1983

[54] CLAD STEEL PLATES

[76] Inventor: Akira Takayasu, 5-1 Horita-dor, Mizuho-ku, Nagoya-shi, Aichi 467, Japan

[21] Appl. No.: 224,537
[22] PCT Filed: Mar. 14, 1980
[86] PCT No.: PCT/JP80/00044
 § 371 Date: Dec. 18, 1980
 § 102(e) Date: Dec. 8, 1980
[87] PCT Pub. No.: WO80/02246
 PCT Pub. Date: Oct. 30, 1980

[30] Foreign Application Priority Data

Apr. 18, 1979 [JP] Japan .............................. 54-52585[U]

[51] Int. Cl.$^3$ ................................................. B32B 3/30
[52] U.S. Cl. .................................... 428/594; 228/175
[58] Field of Search ................ 219/112; 228/107, 109, 228/175, 190; 428/555, 594, 608, 677, 683; 33/DIG. 11

[56] References Cited

U.S. PATENT DOCUMENTS 2,438,759  3/1948  Liebowitz ........................... 228/175
2,718,690  9/1955  Ulam ................................... 228/175
3,001,059  9/1961  Jones ................................ 228/186 X
3,672,033  6/1972  Richter .............................. 228/107
3,787,657  1/1974  Denis et al. ..................... 219/127 X
4,304,821 12/1981 Hayase et al. .................. 228/157 X

FOREIGN PATENT DOCUMENTS 987219    4/1976  Canada ............................... 428/594
2358295   6/1975  Fed. Rep. of Germany ...... 428/608
46-38005 11/1971  Japan .
51-106229 8/1976  Japan .

Primary Examiner—Kenneth J. Ramsey
Assistant Examiner—M. Jordan
Attorney, Agent, or Firm—Parkhurst & Oliff

[57] ABSTRACT

A clad steel plate having a sandwich structure obtained by sandwiching a thin copper sheet and a stainless steel net between a plate of steel such as carbon steel, alloy steel or the like and an anticorrosive plate of metal such as titanium, tantalum, niobium, zirconium or the like, wherein the steel plate and anticorrosive metal plate are bonded to each other through the net and thin copper sheet by local welding between mutual portions to be joined. The clad steel plate can be produced cheaply and simply, and has excellent electrical and heat conductivities.

1 Claim, 5 Drawing Figures

CLAD STEEL PLATES

TECHNICAL FIELD

This invention relates to clad steel plates manufactured by cladding a plate of steel such as carbon steel, alloy steel or the like with an anticorrosive metal plate through a copper thin sheet and a stainless steel net.

BACKGROUND ART

Up to now, anticorrosive plates of metals such as titanium, tantalum, niobium, zirconium and the like having an excellent corrosion resistance have been widely used in various applications, including chemical instruments. Particularly, heavy-gauge anticorrosive metal plate is used in large-size instruments, vacuum instruments and the like.

However, this type of anticorrosive metal is very expensive, so that the instruments using heavy-gauge anticorrosive metal plate are restricted in their use range.

There has been proposed an attempt to reduce the material cost by using a clad steel plate consisting of a steel plate having a certain strength and an anticorrosive metal plate covered thereon, but it is difficult to sufficiently bond the anticorrosive metal plate to the steel plate by the usual method of welding. Therefore, there are often used explosive welded clad plates produced by cladding the anticorrosive metal plate on the steel plate by an explosive welding process using a powder. However, these explosive welded clad plates require a long time for the completion of production, owing to the presence of patent rights and other circumstances. Consequently, the delivery time becomes long. Other disadvantages of the explosive welding process are the facts that the working step is dangerous and the production cost is high, the applicable uses are limited.

DISCLOSURE OF INVENTION

It is an object of the invention to solve the above mentioned drawbacks of the prior art and to provide clad steel plates which are safe and simple in the working step, short in the delivery time and low in the production cost, and have a high peel strength as well as excellent electrical and heat conductivities.

According to the invention, there is provided a clad steel plate having a sandwich structure, obtained by sandwiching a thin copper sheet and a stainless steel net between a plate of steel such as carbon steel, alloy steel or the like and an anticorrosive plate of metal such as titanium, tantalum, niobium, zirconium or the like, wherein said steel plate and anticorrosive metal plate are bonded to each other through said thin sheet and net by local welding between mutual portions to be joined.

BEST MODE OF CARRYING OUT THE INVENTION

An embodiment of the invention will be described with reference to the accompanying drawing.

Figure 1A:
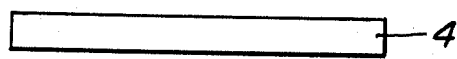
FIGS. 1(a)~(d) are diagrammatic views showing each member of the clad steel plate according to an embodiment of the invention and the cladding state of these members, respectively.
Figure 1B:
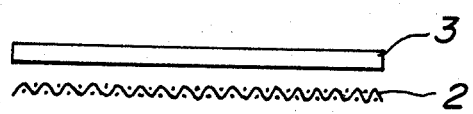
Figure 1C:
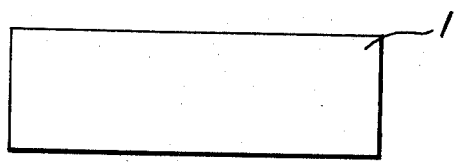
Figure 1D:
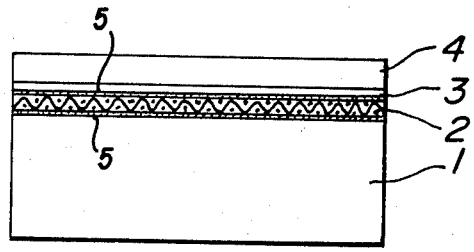
Figure 2:
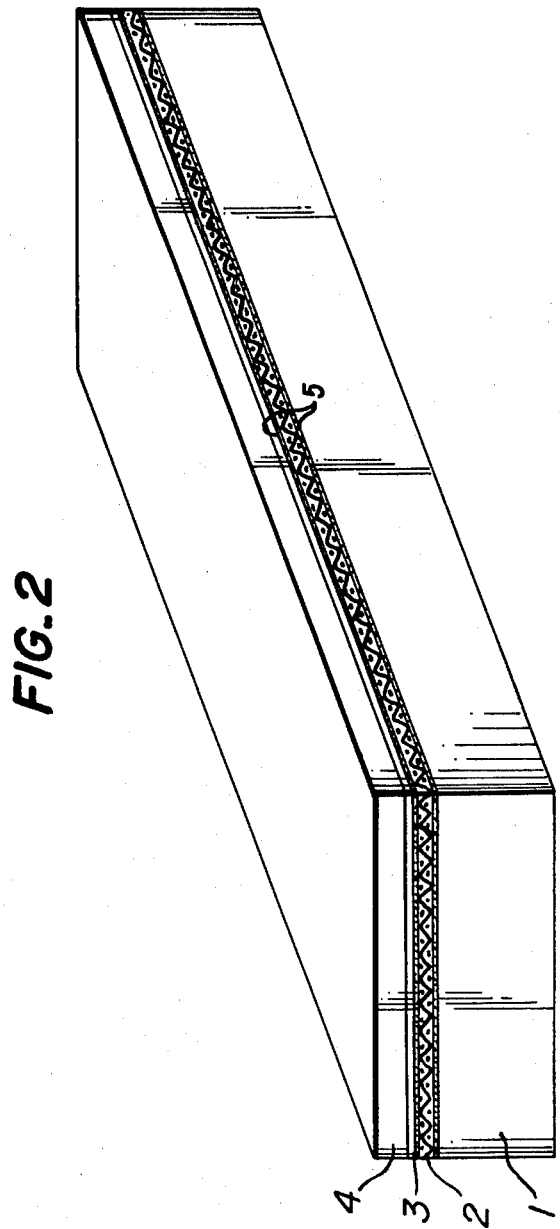
FIG. 2 is a perspective view of the clad steel plate produced by seam welding.

FIGS. 1(a)~(d) are diagrammatic views showing each member of the clad steel plate according to the invention and the cladding state thereof, and FIG. 2 is a perspective view illustrating the clad steel plate produced by locally bonding the steel plate to the anticorrosive metal plate by means of seam welding. In the drawing, numeral 1 is a plate of steel such as low carbon steel, alloy steel or the like, numeral 2 a stainless steel net, numeral 3 a thin copper sheet, and numeral 4 an anticorrosive metal plate.

In the production of clad steel plates using such members, the anticorrosive metal plate 4 with a thickness of, for example, 0.1~1.0 mm as shown in FIG. 1(a), the thin copper sheet with a thickness of, for example, 0.1~0.5 mm, the stainless steel net 2 of 304 mesh made of SUS material as shown in FIG. 1(b) and the steel plate 1 with a thickness of, for example, 2~20 mm as shown in FIG. 1(c) are cut into the same shape, respectively, and then piled one upon the other so as to sandwich the stainless steel net 2 and the copper sheet 3 between the steel plate 1 and the anticorrosive metal plate 4, as shown in FIG. 1(d). In this case, the stainless steel net 2 and thin copper sheet 3 may temporarily be bonded to the steel plate 1 before the anticorrosive metal plate 4 is piled thereon. Then, the assembled plate of the sandwich structure is subjected to a seam welding for the formation of seam beads 5 as shown in FIG. 2, whereby the thin copper sheet 3 is fused into the meshes of the stainless steel net 2 to bond the steel plate 1 and the anticorrosive metal plate 4 to each other owing to the local welding between portions to be joined. In addition to the seam welding, a spot welding may be used. When the assembled plate is subjected to the seam welding with a seam width of 3~5 mm and an interval of about 15 mm, the resulting clad steel plate has a sufficient peel strength as well as excellent electrical and heat conductivities.

With a clad steel plate having the above structure, the heat conductivity can be increased by about 10%, as compared with the clad steel plate produced by sandwiching two copper thin sheets between the steel plate and the anticorrosive metal plate, without decreasing the electrical conductivity. Furthermore, the peel strength of the former can be increased to about 14.6 kg/mm$^2$ as compared with that of the latter which is about 11.2 kg/mm$^2$. Thus, the clad steel plates according to the invention are favorable for use in large-size instruments and vacuum instruments as well as double-wall heat transmitting tubes, materials for electrode plate and the like.

Moreover, if it is desired to require a greater increase in the peel strength, the local welding as described above may be performed after reversing the order of stainless steel net and thin copper sheet shown in the drawing, whereby the peel strength can be increased to about 15.5 kg/mm$^2$.

As mentioned above, the clad steel plates according to the invention, wherein the stainless steel net and copper thin sheet are sandwiched between the steel plate and the anticorrosive metal plate, have the following advantages:

(1) In the conventional explosive welding process, it is difficult to use a thin anticorrosive metal plate. In contrast, with the clad steel plate according to the present invention, the thickness of the anticorrosive metal plate can be selected in accordance with the use conditions which the plate will be subjected to, so that the production cost can be reduced considerably.

(2) In the conventional explosive welding process, the production equipment and operation become large-scaled beyond expectations and the working site should be located far from town. In contrast, according to the present invention, the steel plate and anticorrosive metal plate are bonded by welding to each other through the stainless steel net and thin copper sheet, so that the equipment and working operation are relatively simple, the location of the work site is not a factor, and the delivery time is faster. Furthermore, the clad steel plate according to the present invention can be easily be produced in accordance with the quantities of raw material provided, even if such quantities are small.

(3) According to the present invention, explosive powders and the like are not used so that the production site does not cause a public nuisance such as noise or the like.

(4) According to the present invention, the anticorrosive metal plate is bonded by welding to the steel plate with sufficient strength so that the resulting clad steel plate can be used as a material for vacuum instruments, high pressure instruments or the like without difficulty.

(5) A clad steel plate having excellent electrical and heat conductivities can be obtained by using a thin copper sheet as a middle member. The clad steel plate according to the present invention demonstrates an improved heat conductivity due to the fusing of the thin copper sheet into the meshes of the stainless steel net. Therefore, the clad steel plates according to the present invention are particularly favorable as a material for heat conductive instruments and electrical conductive instruments.

(6) Finally, the present invention eliminates the dangers in the work place associated with explosive powders and the process of explosive welding.

I claim:

1. A clad steel plate produced by sandwiching a thin copper sheet and a stainless steel net between a steel plate and an anticorrosive metal plate and locally bonding them to each other by welding.

* * * * *